US012607733B2

(12) United States Patent     (10) Patent No.:   US 12,607,733 B2

Sakurai et al.     (45) Date of Patent:    Apr. 21, 2026

(54) WIRELESS TAG READING APPARATUS, STORAGE MEDIUM, AND METHOD

(71) Applicant: Toshiba Tec Kabushiki Kaisha, Tokyo (JP)

(72) Inventors: Wataru Sakurai, Izu Shizuoka (JP); Nobuo Murofushi, Susono Shizuoka (JP); Shigeaki Suzuki, Gotemba Shizuoka (JP); Yuki Suzuki, Izunokuni Shizuoka (JP); Masaki Kimura, Izunokuni Shizuoka (JP); Yuichiro Kawabe, Mishima Shizuoka (JP); Haruka Otake, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 205 days.

(21) Appl. No.: 18/359,828

(22) Filed: Jul. 26, 2023

(65) Prior Publication Data

US 2024/0094369 A1     Mar. 21, 2024

(30) Foreign Application Priority Data

Sep. 20, 2022    (JP) ................................. 2022-149331

(51) Int. Cl.
    *G01S 13/06*       (2006.01)
    *G01S 5/02*        (2010.01)
(52) U.S. Cl.
    CPC ................ *G01S 13/06* (2013.01); *G01S 5/02* (2013.01)

(58) Field of Classification Search
None
See application file for complete search history.

(56) References Cited

U.S. PATENT DOCUMENTS

| | | | |
|---|---|---|---|
| 10,586,082 B1 * | 3/2020 | Tang ...................... | G06N 20/00 |
| 2013/0278386 A1 * | 10/2013 | Zumsteg .............. | G06K 7/1413 |
| | | | 340/10.1 |
| 2019/0180063 A1 | 6/2019 | Suzuki | |

FOREIGN PATENT DOCUMENTS

| | | |
|---|---|---|
| JP | 2021-140682 A | 9/2021 |
| JP | 7007170 B | 1/2022 |

\* cited by examiner

*Primary Examiner* — Whitney Moore

(74) *Attorney, Agent, or Firm* — Kim & Stewart LLP

(57) ABSTRACT

A reading apparatus includes a mechanism to move an antenna between first and second positions, and a controller configured to: (a) control the antenna to transmit radio waves to wireless tags each attached to an object when the antenna is between the first and second positions; acquire, from response waves, information registered in each tag and indicating attributes of the object and the tag, and signal values of the response waves; and calculate an estimated position of each tag and a reliability level thereof based on the values. When the level of the position of a tag is less than a threshold or when the information of a tag indicates an attribute that can affect radio communications, the controller performs step (a) again, acquires signal values of response waves received from the tag, and calculates an estimated position of the tag and a reliability level thereof based on the values.

16 Claims, 12 Drawing Sheets

Figure 8:
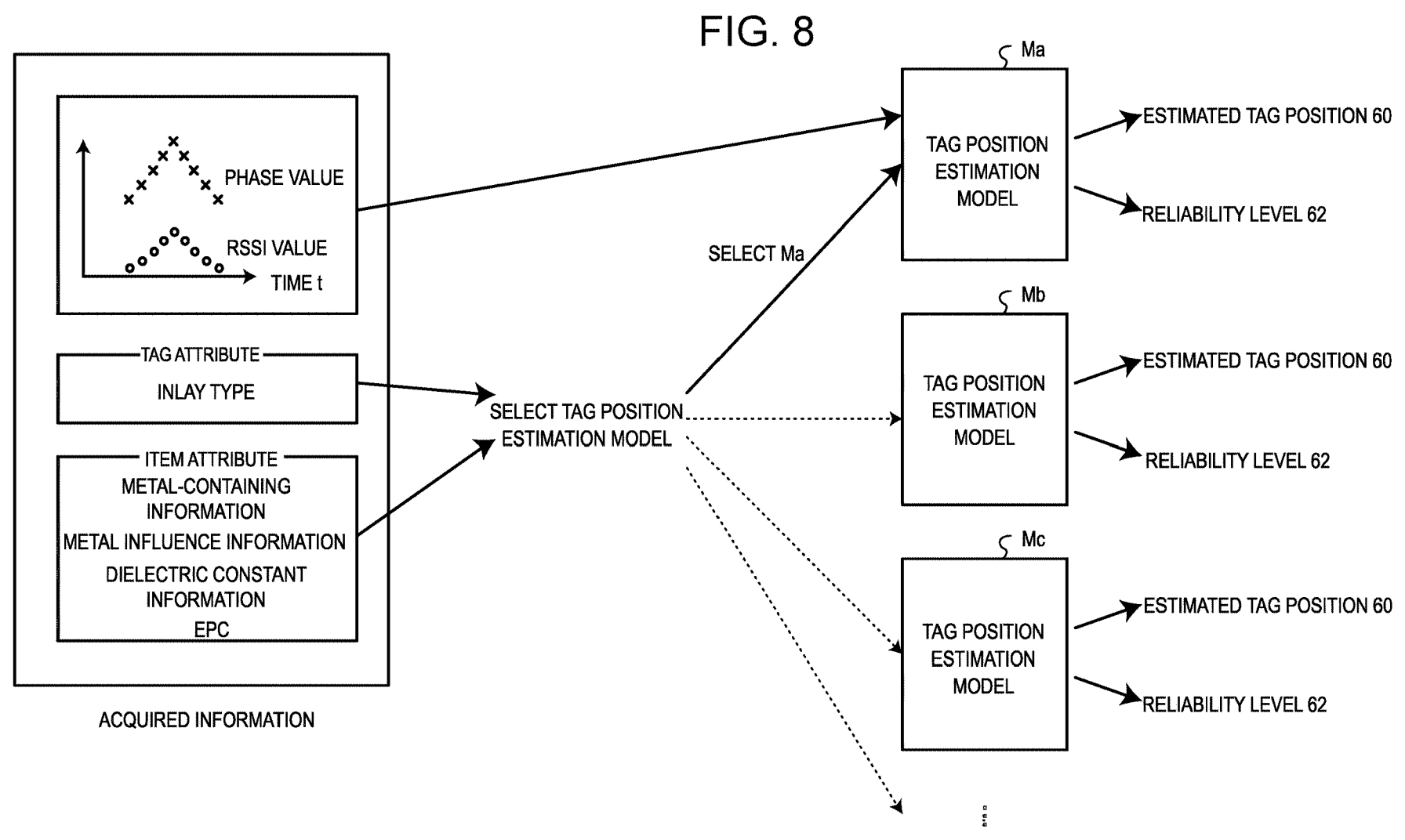

TAG POSITION ESTIMATION MODEL

→ ESTIMATED TAG POSITION 60
→ RELIABILITY LEVEL 62

Mb

TAG POSITION ESTIMATION MODEL

→ ESTIMATED TAG POSITION 60
→ RELIABILITY LEVEL 62

Mc

TAG POSITION ESTIMATION MODEL

→ ESTIMATED TAG POSITION 60
→ RELIABILITY LEVEL 62

SELECT Ma

SELECT TAG POSITION ESTIMATION MODEL

ACQUIRED INFORMATION

PHASE VALUE

RSSI VALUE

TIME t

TAG ATTRIBUTE

INLAY TYPE

ITEM ATTRIBUTE
METAL-CONTAINING INFORMATION
METAL INFLUENCE INFORMATION
DIELECTRIC CONSTANT INFORMATION
EPC

31

51

RADIO WAVE TRANSMISSION/RECEPTION UNIT

52

ANTENNA MOVEMENT CONTROL UNIT

53

RESPONSE WAVE ACQUISITION UNIT

54

TAG POSITION ESTIMATION UNIT

55

TAG INFORMATION ACQUISITION UNIT

56

REREADING CONTROL UNIT

57

NOTIFICATION UNIT

WIRELESS TAG READING APPARATUS, STORAGE MEDIUM, AND METHOD

CROSS-REFERENCE TO RELATED APPLICATION(S)

This application is based upon and claims the benefit of priority from Japanese Patent Application No. 2022-149331, filed Sep. 20, 2022, the entire contents of which are incorporated herein by reference.

FIELD

Embodiments described herein relate generally to a wireless tag reading apparatus, a storage medium, and a method.

BACKGROUND

Conventionally, there has been known a wireless tag reading apparatus that reads information from a wireless tag attached to an item placed in a basket while moving an antenna.

In such a wireless tag reading apparatus, it is determined whether the item to which the wireless tag is attached is in a predetermined area (for example, in a basket) based on a Received Signal Strength Indicator (RSSI) and a phase value of a response wave from the wireless tag, and information registered in the wireless tag is read. However, in a case where the item to which the wireless tag is attached is an item that influences reading performance, such as an item containing a metal, there is a problem that the accuracy of determining the position of the wireless tag is reduced.

SUMMARY OF THE INVENTION

Embodiments provide a wireless tag reading apparatus, a storage medium, and a method capable of correctly reading information from a wireless tag in a predetermined area even when an object to which a wireless tag is attached influences reading performance.

According to an aspect of this disclosure, a wireless tag reading apparatus comprises an antenna, a driving mechanism configured to move the antenna between first and second positions, and a controller configured to: (a) cause the driving mechanism to move the antenna from the first position to the second position, and control the antenna to transmit radio waves to one or more wireless tags each attached to an object one or more times when the antenna is between the first and second positions, (b) acquire, from response waves received from the wireless tags: information that is registered in each of the wireless tags and indicates an attribute of the corresponding object and an attribute of the wireless tag, and signal strength and phase values of the response waves, and (c) calculate an estimated position of each of the wireless tags and a reliability level of the estimated position based on the signal strength and phase values. When the reliability level of the estimated position of one of the wireless tags is less than a threshold value or when the information registered in one of the wireless tags indicates an attribute that can affect radio communications, the controller performs step (a) again, acquires signal strength and phase values of response waves received from said one of the wireless tags, and calculates an estimated position of said one of the wireless tags and a reliability level thereof based on the acquired signal strength and phase values.

BRIEF DESCRIPTION OF THE DRAWINGS

FIG. 8 is a diagram for explaining a process of estimating a tag position based on information acquired by the wireless tag reading apparatus.

DETAILED DESCRIPTION

Embodiments will be described below with reference to the drawings.

(Schematic Configuration of Wireless Tag Reading Apparatus)

Figure 1:
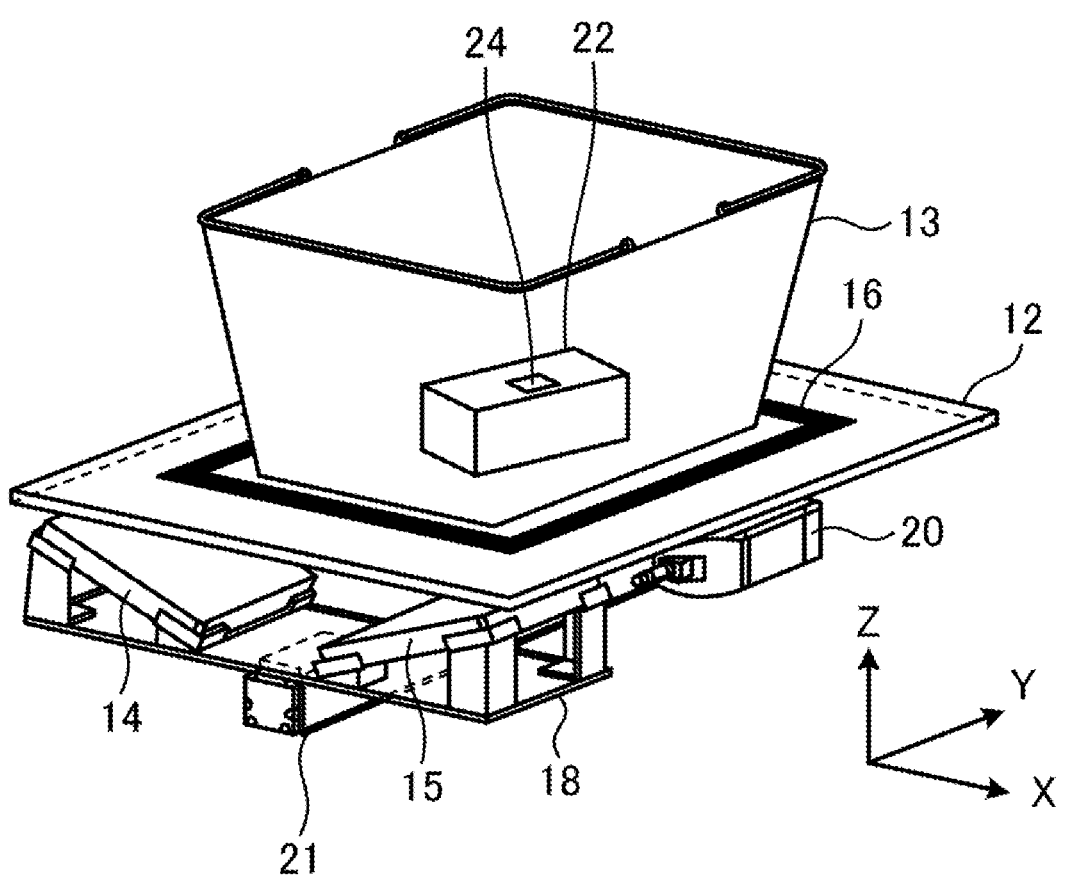
FIG. 1 is an external perspective view of a wireless tag reading apparatus according to an embodiment.
Figure 2:
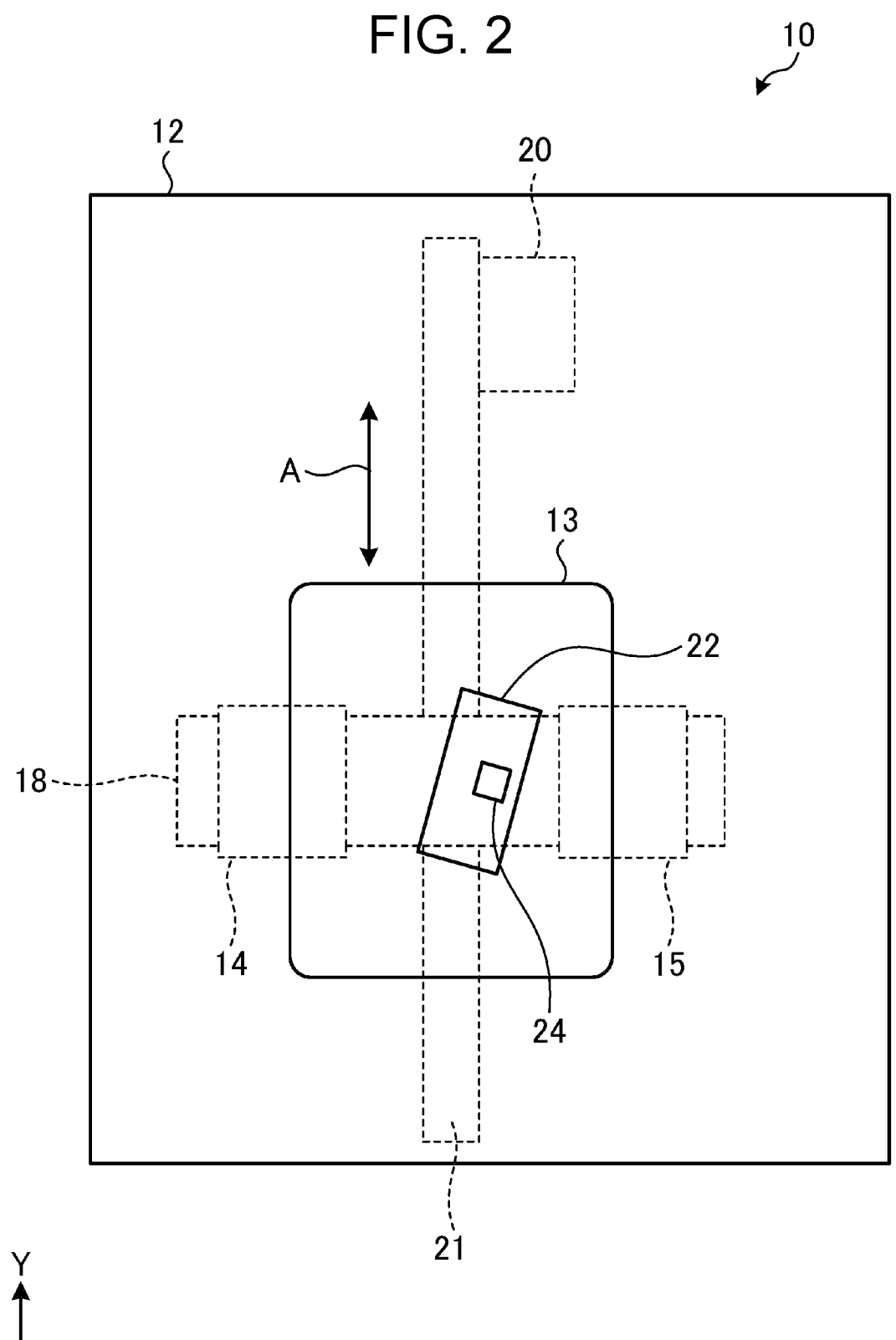
FIG. 2 is a top view of a part around an antenna of the wireless tag reading apparatus according to an embodiment.

A schematic configuration of a wireless tag reading apparatus 10 will be described with reference to FIGS. 1 and 2. FIG. 1 is an external perspective view illustrating an example of a configuration of the wireless tag reading apparatus 10 according to an embodiment. FIG. 2 is a top view of a part around an antenna of the wireless tag reading apparatus 10 according to the embodiment.

The wireless tag reading apparatus 10 is installed in, for example, a self-service checkout machine. As shown in FIG. 1, the wireless tag reading apparatus 10 moves a pair of antennas 14 and 15, which are mounted on a moving stage 18, along the Y-axis under a basket 13 in which an item 22 purchased by a customer is placed. The basket 13 is placed on a table 12. The pair of antennas 14 and 15 are arranged below the table 12 along the X-axis. The pair of antennas 14 and 15 are tilted about the Y-axis toward a position where the basket 13 is placed. The basket 13 is placed in a predetermined position on the table 12, for example, inside a position marker 16 provided on the table 12. Multiple items 22 are placed in the basket 13. The basket 13 is an example of a container in the present disclosure. Further, the item 22 is an example of an object in the present disclosure. Note that the item 22 may be directly placed in the position marker 16 on the table 12. That is, the basket 13 may be omitted.

As shown in FIG. 2, the moving stage 18 is moved along a rail 21 in the Y-axis direction, that is, in the direction of an arrow A, by the rotational driving force of a driving motor 20. Here, the combination of the moving stage 18, the driving motor 20, and the rail 21 is an example of a driving mechanism.

The antenna 14 and the antenna 15 transmit radio waves (transmission waves) for reading information (tag information) registered in an RFID tag 24 attached to the item 22 in a time division manner while being moved in the Y-axis direction. The antenna 14 and the antenna 15 receive radio waves (response waves) from the RFID tag 24. The wireless tag reading apparatus 10 repeatedly transmits and receives radio waves at predetermined time intervals.

Since the RFID tag 24 has directivity, the wireless tag reading apparatus 10 includes two antennas 14 and 15 and transmits transmission waves from different directions so as to be able to reliably detect response waves from the RFID tag 24 regardless of the orientation of the RFID tag 24 inside the basket 13. The number of antennas is not limited to two.

The Radio Frequency Identification (RFID) tag 24 is an example of a wireless tag in the present disclosure. The RFID tag 24 includes an antenna and receives a transmission wave transmitted from each of the antennas 14 and 15 by near field communication. In addition, the RFID tag 24 transmits data stored in a storage medium of the RFID tag 24 as a response wave in response to the transmission wave. The RFID tag 24 stores tag information in the storage medium. The tag information includes, for example, an item code (for example, an Electronic Product Code (EPC)) for identifying the item 22 to which the RFID tag 24 is attached. The RFID tag 24 transmits the item code or the like stored in the storage medium when receiving a radio wave for reading information stored in the storage medium from each of the antennas 14 and 15.

As shown in FIG. 1, a monitoring camera 26 is disposed above the table 12 to face the table 12. The monitoring camera 26 monitors a range covering the table 12 and its surroundings, for example, a range indicated by an angle of view co in FIG. 1. The wireless tag reading apparatus 10 analyzes a video captured by the monitoring camera 26 while the antenna 14 and the antenna 15 are moving, and recognizes whether the basket 13, the item 22, or a person is moving. Details will be described later. Note that the monitoring camera 26 is an example of an imaging unit in the present disclosure.

In order to prevent the radio wave environment from being disturbed by external foreign matters, the wireless tag reading apparatus 10 may include a shield that blocks radio waves and surrounds the basket 13 on the table 12.

(Hardware Configuration of Wireless Tag Reading Apparatus)

Figure 3:
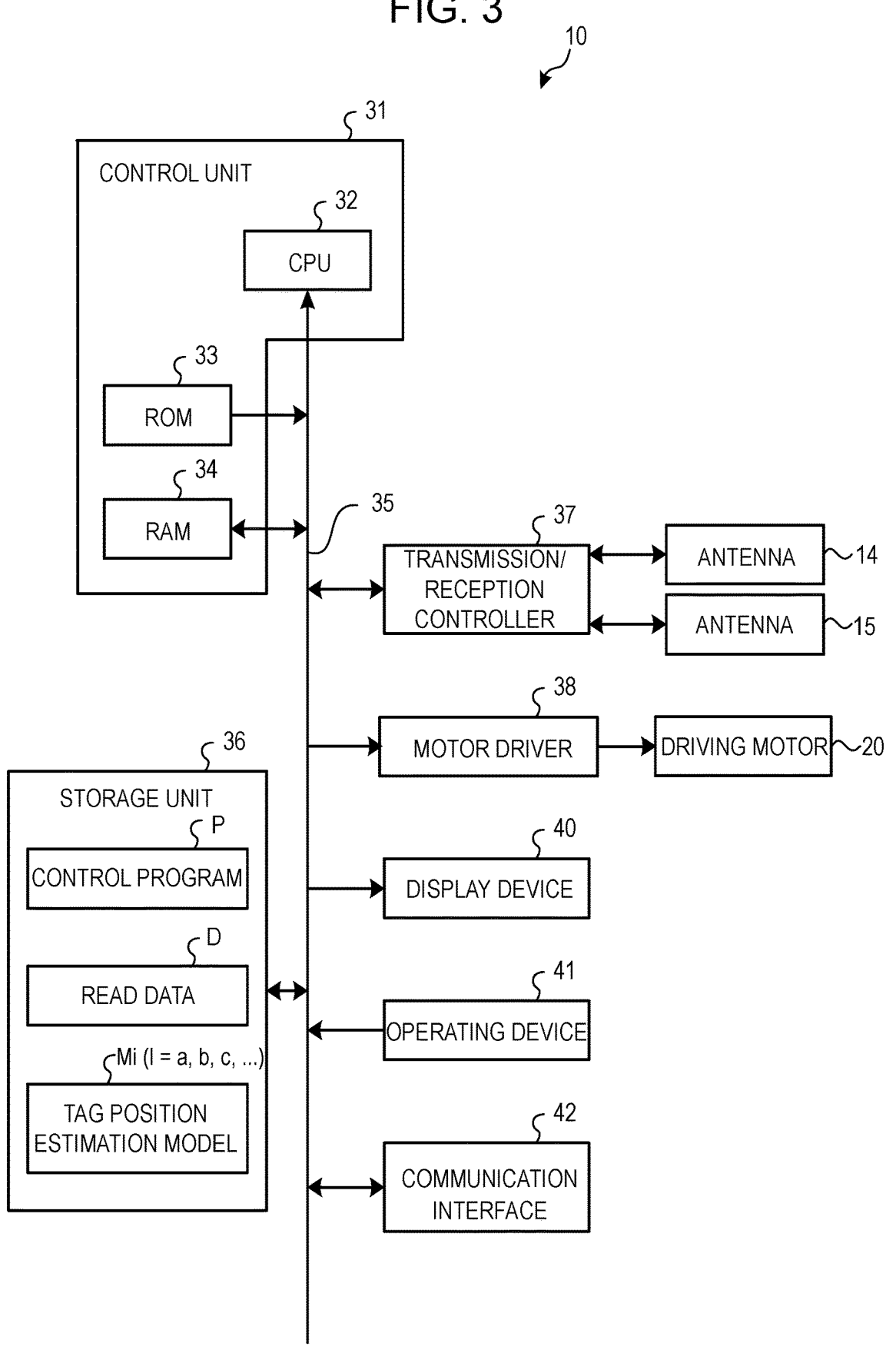
FIG. 3 is a block diagram of a hardware configuration of the wireless tag reading apparatus according to an embodiment.

A hardware configuration of the wireless tag reading apparatus 10 will be described with reference to FIG. 3. FIG. 3 is a block diagram illustrating an example of a hardware configuration of the wireless tag reading apparatus 10 according to the embodiment.

The wireless tag reading apparatus 10 includes a control unit 31 for controlling components of the wireless tag reading apparatus 10. The control unit 31 is an example of a controller. The control unit 31 includes a Central Processing Unit (CPU) 32, a Read-Only Memory (ROM) 33, and a Random Access Memory (RAM) 34. The CPU 32 is connected to the ROM 33 and the RAM 34 via an internal bus 35, such as an address bus and a data bus. The CPU 32 loads various programs stored in the ROM 33 and the storage unit 36 into the RAM 34. The CPU 32 controls the operation of the wireless tag reading apparatus 10 by executing the various programs loaded into the RAM 34. That is, the control unit 31 has a configuration of a general computer.

The control unit 31 is connected to a storage unit 36, a transmission/reception controller 37, a motor driver 38, a camera driver 39, a display device 40, an operating device 41, and a communication interface 42 via an internal bus 35.

The control unit 31 functions as a reader that reads data registered in the RFID tag 24 by cooperating with the transmission/reception controller 37, the antenna 14, and the antenna 15. In addition, the control unit 31 may function as a writer that writes data to the RFID tag 24.

The control unit 31 acquires information for identifying the antenna 14 or 15, a time at which a response wave is received, a Received Signal Strength Indicator (RSSI) value and a phase value related to the response wave, and tag attribute information and item attribute information read from the RFID tag 24 in association with each other. The RSSI value indicates the strength of the response wave returned from the RFID tag 24. The phase value indicates a phase difference between the transmission wave and the response wave returned from the RFID tag 24. Based on the phase value, the distance between the antenna 14 and the RFID tag 24 or the distance between the antenna 15 and the RFID tag 24 can be estimated. The RSSI and phase values will be described in detail later (see FIG. 5B). The tag attribute information is information indicating various attributes related to the configuration of the RFID tag 24. The item attribute information indicates various attributes of the item 22 to which the RFID tag 24 is attached. The tag attribute information and the item attribute information will be described in detail later (see FIG. 4).

The storage unit 36 is a storage device including a nonvolatile storage medium such as a Hard Disk Drive (HDD) or a Solid State Drive (SSD). The storage unit 36 stores various programs and various types of data related to the operation of the wireless tag reading apparatus 10.

The storage unit 36 stores a control program P, read data D, and tag position estimation models Mi (i=a, b, c, . . . ).

The control program P is a program for operating the wireless tag reading apparatus 10.

The read data D is time-series data acquired from RFID tags 24 while moving the antennas 14 and 15. Contents of the read data D will be described in detail later (see FIG. 4).

Each tag position estimation model Mi (i=a, b, c, . . . ) is a learning model for estimating the position of the RFID tag 24 that has received the response wave. The tag position estimation model Mi is trained by placing the RFID tag 24 at multiple predetermined positions and accumulating and storing response waves received by the wireless tag reading apparatus 10 and outputs the position of the RFID tag 24 in response to an input of a response wave of the RFID tag 24. More specifically, the tag position estimation models Mi are generated for respective types of RFID tags 24 or for respective attributes of items 22 to which the RFID tag 24 are to be attached, based on RSSI values and phase values of the response waves from the RFID tags 24. The tag position estimation models Mi will be described in detail later (see FIG. 7).

The transmission/reception controller 37 transmits and receives radio waves to and from the control unit 31, the antenna 14, and the antenna 15.

The motor driver 38 is a controller for the driving motor 20 that drives the moving stage 18. The motor driver 38 controls the driving motor 20 in accordance with an instruction to move the antennas 14 and 15 output by the control unit 31.

In response to an instruction from the control unit 31, the camera driver 39 controls an imaging operation of the monitoring camera 26.

The display device 40 displays a screen generated by an instruction from the control unit 31. The display device 40 is implemented by a device such as a Liquid Crystal Display (LCD) or an organic Electro-Luminescence (EL) display.

The operating device 41 acquires an input operation from the operator and sends the input operation to the control unit 31. The operating device 41 includes a device such as a touch panel or a keyboard.

The communication interface 42 is an interface for communicating with an external device such as a POS terminal or a store server (not shown) via a network or the like. The wireless tag reading apparatus 10 outputs a reading result of the RFID tag 24 to the external device.

(Description of Information Acquired by Wireless Tag Reading Apparatus)

Figure 4:
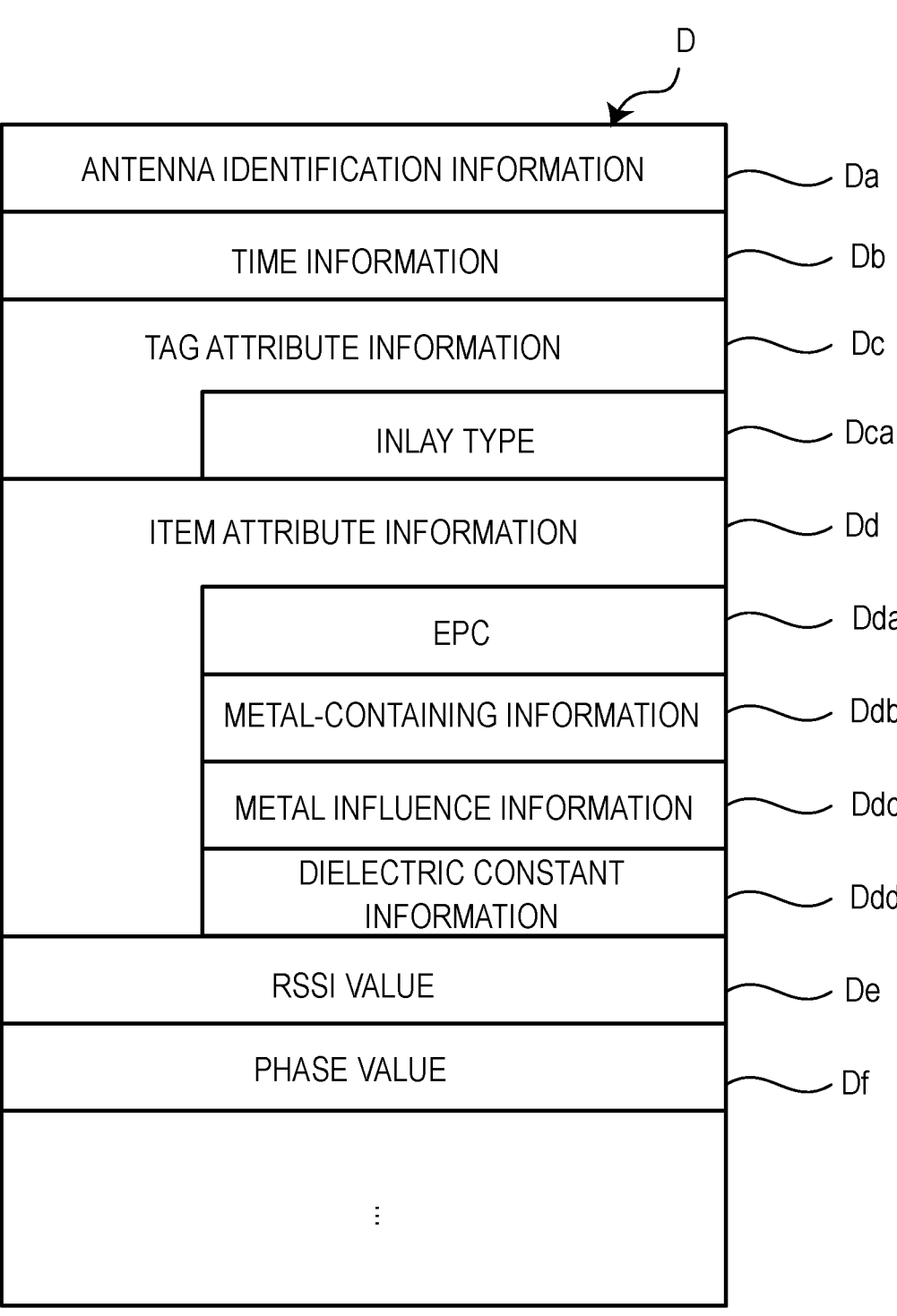
FIG. 4 is a diagram illustrating data acquired from an RFID tag by the wireless tag reading apparatus according to an embodiment.

The contents of the read data D acquired from the RFID tag 24 by the wireless tag reading apparatus 10 will be described with reference to FIG. 4. FIG. 4 is a diagram illustrating an example of data acquired from an RFID tag by the wireless tag reading apparatus 10.

The read data D includes antenna identification information Da, time information Db, tag attribute information Dc, item attribute information Dd, an RSSI value De, and a phase value Df in association with each other.

The antenna identification information Da is information for identifying the antenna 14 or the antenna 15 that has received the response wave.

The time information Db is information indicating the time at which the response wave of the RFID tag 24 is received. The time information Db is measured by the control unit 31. Instead of the time information Db, position information indicating the position of the antenna 14 or the position of the antenna 15 when the response wave of the RFID tag 24 is received may be stored. The position of each of the antennas 14 and 15 may be determined by, for example, detecting the amount of movement of the moving stage 18 from a predetermined home position in a direction defined by the rotation direction of the driving motor 20 based on the number of revolutions of the driving motor 20.

The tag attribute information Dc is information indicating an attribute related to the configuration of the RFID tag 24.

The tag attribute information Dc includes, for example, information related to an inlay type Dca. The RFID tag 24 is formed of an IC tag chip and an RFID tag antenna (inlay), and there are various types of RFID tag antenna (inlay). Some inlays may influence reading performance. Thus, the inlay type Dca indicates that an inlay that may influence the reading performance is used.

The item attribute information Dd is information indicating various attributes of the item 22 to which the RFID tag 24 is attached.

The item attribute information Dd includes, for example, an EPC Dda, metal-containing information Ddb, metal influence information Ddc, and dielectric constant information Ddd.

The EPC Dda is an item code that for identifying the item 22. The EPC Dda is, for example, a Japanese Article Number (JAN) code.

The metal-containing information Ddb is information indicating whether the item 22 contains a metal. When the item 22 contains a metal, the impedance matching between an IC tag chip and an antenna of the RFID tag 24 is lost. As a result, the antenna becomes non-functional, and the reading performance may be degraded. An example of an item 22 containing a metal is an item including lame. Thus, the metal-containing information Ddb indicates that an item includes a metal.

The metal influence information Ddc is information indicating that an item contains a metal and particularly influences the reading performance. For example, the metal influence of an item including lame varies depending on the thickness and quantity of lame thread and the method of sewing lame thread. In addition, even in the case of an item including lame, when the surface of the item has irregularities, the distance between the RFID tag 24 and the item including lame may increase, and the influence of lame on the reading performance may be reduced. Thus, the metal influence information Ddc indicates an item that contains a metal and particularly influences the reading performance.

The dielectric constant information Ddd is information indicating whether the item 22 has a high dielectric constant. When the item 22 has a high dielectric constant, the performance of the RFID tagged antenna may be degraded. An example of the item 22 having a high dielectric constant is an item including denim. Thus, the dielectric constant information Ddd indicates that the dielectric constant of an item may influence the reading performance.

Although not illustrated in FIG. 4, an item containing a large amount of water, such as a cosmetic item, may also influence the reading performance and therefore may be managed by assigning the item attribute-information Dd to the item.

The RSSI value De indicates the strength of the response wave returned from the RFID tag 24.

The phase value Df represents a phase difference between the transmission wave and the response wave returned from the RFID tag 24. The phase value Df varies between 0° and 359°. When the phase difference between the transmission wave and the response wave changes from 359° to 360°, the phase value becomes 0° again. Therefore, the phase value acquired by the wireless tag reading apparatus 10 is discontinuous between 359° and 0°. Therefore, the wireless tag reading apparatus 10 performs a process of correcting an acquired phase value. Specifically, when the phase value changes from 359° to 0°, the phase value after the change is corrected to 360°. When the phase value changes from 0° to 359°, the phase value after the change is corrected to −1°. Accordingly, the phase value Df acquired by the wireless tag reading apparatus 10 continuously changes with time.

The read data D has a predetermined bit length. Each of the information items described above is placed in a predetermined bit position in the read data D. Since the wireless tag reading apparatus 10 reads multiple sets of data from multiple RFID tags 24 while moving the antennas 14 and 15 to various positions, the wireless tag reading apparatus 10 acquires multiple sets of read data D in time series.

(Explanation of RSSI and Phase Values)

Figure 5A:
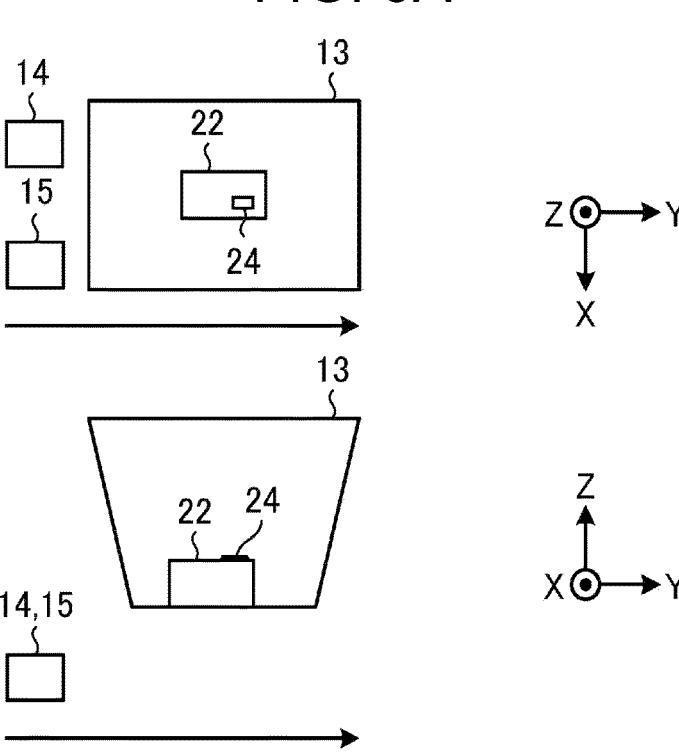
FIG. 5A is a top view and a side view of a state in which the wireless tag reading apparatus is reading information from an RFID tag attached to an item in a basket.
Figure 5B:
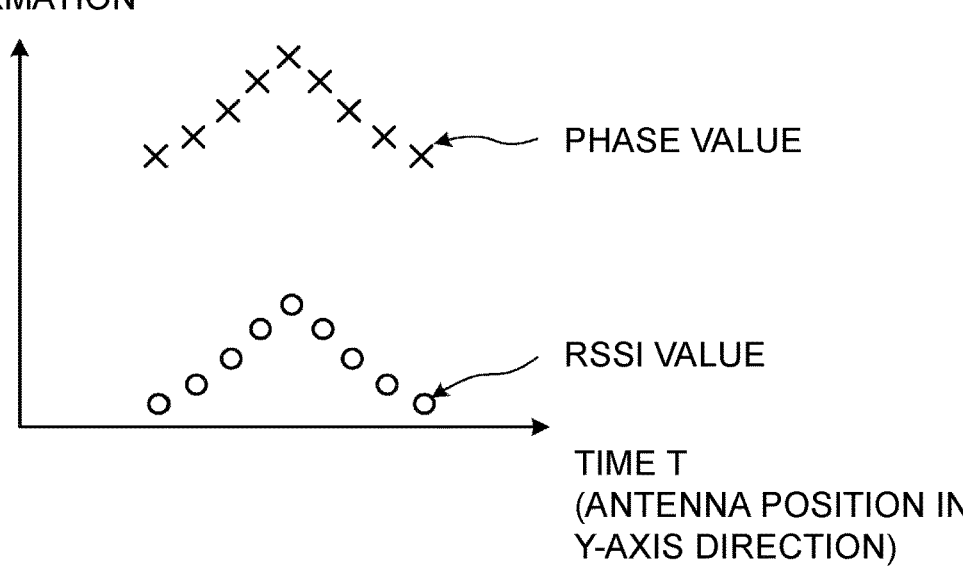
FIG. 5B is a diagram for explaining RSSI and phase values.

The RSSI value De and the phase value Df acquired by the wireless tag reading apparatus 10 will be described with reference to FIG. 5A and FIG. 5B. FIG. 5A is a top view and a side view of a state in which the wireless tag reading apparatus 10 is reading information from the RFID tag 24 attached to the item 22 in the basket 13. FIG. 5B is a diagram for explaining the RSSI and phase values.

As shown in FIG. 5A, the wireless tag reading apparatus 10 transmits radio waves from the antennas 14 and 15 toward the basket 13 in a time-division manner while moving the antennas 14 and 15 along the Y-axis under the basket 13 placed in a predetermined position. Then, the antennas 14 and 15 receive response waves from the RFID tag 24 attached to the item 22 as responses to the transmission waves transmitted by the antennas 14 and 15.

Since the radio waves are transmitted and the response waves are received at predetermined time intervals while moving the antennas 14 and 15, the wireless tag reading apparatus 10 acquires time-series data of the RSSI value and the phase value as illustrated in FIG. 5B.

The horizontal axis of FIG. 5B represents time t at which the wireless tag reading apparatus 10 acquires the response wave. Further, the horizontal axis in FIG. 5B may be regarded as indicating the position of the antennas 14 and 15 in the Y-axis direction.

In the time series data of the RSSI value, the RSSI value increases as the antenna 14 or 15 moves closer to the RFID tag 24 returning the response wave. Also, in the time series data of the RSSI value, the RSSI value decreases as the antenna 14 or 15 moves away from the RFID tag 24 returning the response wave. Therefore, as shown in FIG. 5B, the RSSI value increases as the antenna 14 or 15 moves closer to the basket 13.

In the time series data of the phase value, the phase value varies depending on the distance between the antenna 14 or 15 and the RFID tag 24 returning the response wave. In FIG. 5B, the phase value increases as the distance between the antenna 14 or 15 and the RFID tag 24 decreases. Note that the phase values shown in FIG. 5B are obtained by correcting discontinuously changing phase values so that they change continuously.

(Explanation of Method for Estimating Position of RFID Tag)

Figure 6:
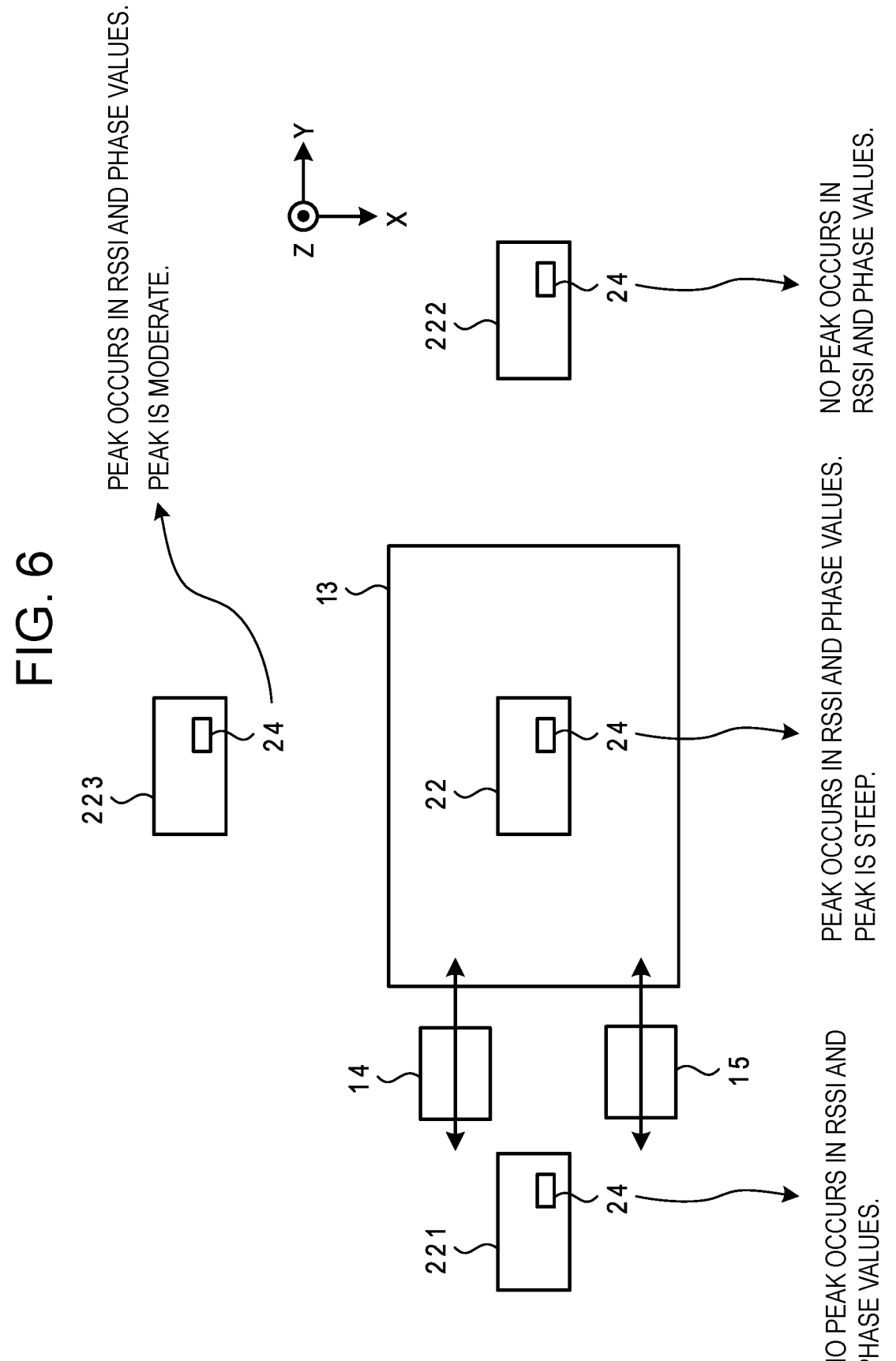
FIG. 6 is a diagram for explaining how to determine whether an RFID tag is inside or outside of a basket.

With reference to FIG. 6, a method performed by the wireless tag reading apparatus 10 to estimate the position of the RFID tag 24 will be described. FIG. 6 is a diagram for describing a method for determining whether an RFID tag is inside or outside of a basket.

A time-series change pattern of each of the RSSI value and the phase value acquired by the wireless tag reading apparatus 10 (refer to FIG. 5B) corresponds to one-to-one to the position of the RFID tag 24. FIG. 6 shows an outline of time-series change patterns of the RSSI and phase values acquired by the wireless tag reading apparatus 10 when the same RFID tag 24 is placed in multiple positions inside and outside the basket 13.

When the item 22 to which the RFID tag 24 is attached is inside of the basket 13, the time-series change pattern of each of the RSSI value and the phase value acquired by the wireless tag reading apparatus 10 shows a steep peak as shown in FIG. 5B.

Assume that an item 221 with the RFID tag 24 is located outside of the basket 13 in a position that is the same as the item 22 in the X-axis direction and is offset in the negative Y-axis direction from the item 22. In this case, the time-series change patterns of the RSSI value and the phase value acquired by the wireless tag reading apparatus 10 show that both of the RSSI value and the phase value monotonically decrease as the antennas 14 and 15 move in the positive Y-axis direction. Also, in this case, no peak occurs in the RSSI value and the phase value.

Assume that an item 222 with the RFID tag 24 is located outside of the basket 13 in a position that is the same as the item 22 in the X-axis direction and is offset in the positive Y-axis direction from the item 22. In this case, the time-series change patterns of the RSSI value and the phase value acquired by the wireless tag reading apparatus 10 show that both of the RSSI value and the phase value monotonically increase as the antennas 14 and 15 move in the positive Y-axis direction. Also, in this case, no peak occurs in the RSSI value and the phase value.

Assume that an item 223 with the RFID tag 24 is located outside of the basket 13 in a position that is the same as the item 22 in the Y-axis direction and is offset in the negative X-axis direction from the item 22. In this case, both of the time-series change patterns of the RSSI value and the phase value acquired by the wireless tag reading apparatus 10 show peaks, but the peaks are moderate compared with the case where the RFID tag 24 is inside of the basket 13.

As described above, the time-series change patterns of the RSSI and phase values acquired by the wireless tag reading apparatus 10 correspond approximately one-to-one to the positions of the RFID tag 24. Each of the tag position estimation models Mi (i=a, b, c, . . . ) stored in the wireless tag reading apparatus 10 associates multiple positions of RFID tags 24 with multiple time-series change patterns of the RSSI value and the phase value that are obtained beforehand by placing the RFID tags 24 in the multiple positions. Each tag position estimation model Mi is trained to output an estimated position of the RFID tag 24 when time-series change patterns of the RSSI and phase values are input.

(Method for Generating Tag Position Estimation Models)

Figure 7:
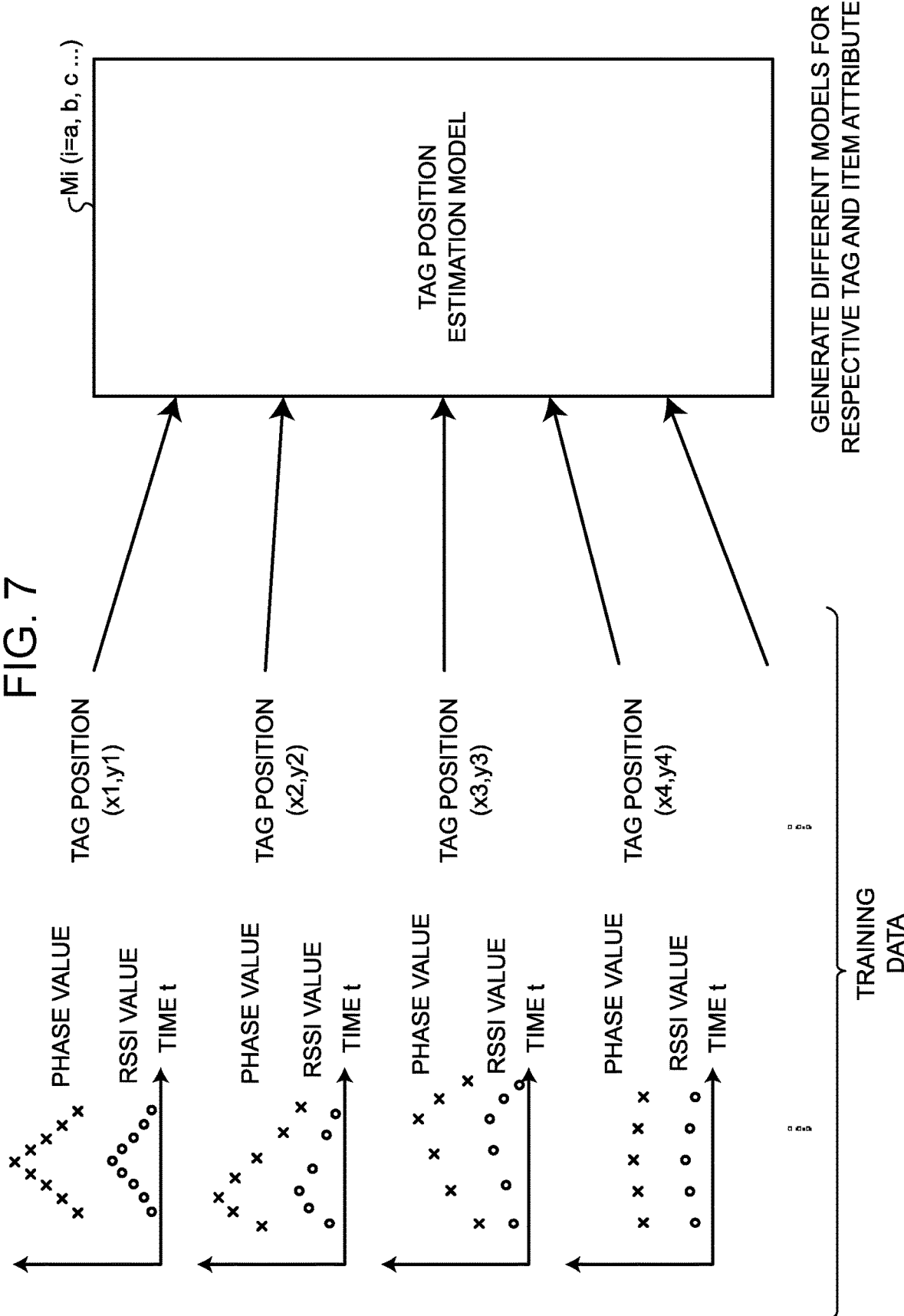
FIG. 7 is a diagram illustrating a method of generating a tag position estimation model according to an embodiment.

With reference to FIG. 7, a method of generating the tag position estimation models Mi (i=a, b, c, . . . ) will be described. FIG. 7 is a diagram illustrating a method of generating the tag position estimation models Mi (i=a, b, c, . . . ).

Each tag position estimation model Mi (i=a, b, c, . . . ) includes time-series change patterns of the RSSI and phase values that are obtained by placing a predetermined RFID tag 24 or a specific item 22 with the RFID tag 24 in multiple predetermined positions (x, y) and by receiving response waves by the wireless tag reading apparatus 10.

In the example illustrated in FIG. 7, the tag position estimation model Mi includes time-series change patterns of the RSSI and phase values that are obtained when a specific RFID tag 24 or an item 22 to which the specific RFID tag 24 is attached is placed in a specific position (x1, y1). Also, the tag position estimation model Mi includes time-series change patterns of the RSSI and phase values that are obtained when the specific RFID tag 24 or the item 22 to which the specific RFID tag 24 is attached is placed in a specific position (x2, y2). Also, the tag position estimation model Mi includes time-series change patterns of the RSSI and phase values that are obtained when the specific RFID tag 24 or the item 22 to which the specific RFID tag 24 is attached is placed in a specific position (x3, y3). Further, the tag position estimation model Mi includes time-series change patterns of the RSSI and phase values that are obtained when the specific RFID tag 24 or the item 22 to which the specific RFID tag 24 is attached is placed in a specific position (x4, y4).

Different tag position estimation models Mi (i=a, b, c, . . . ) are provided for respective tag attributes and item attributes. That is, a tag position estimation model Ma includes time-series change patterns of the RSSI and phase values obtained by placing RFID tags 24 having the same tag attribute in multiple different positions. Also, the tag position estimation model Ma includes time-series change patterns of the RSSI and phase values obtained by placing, in multiple different positions, items 22 that have the same item attribute and to which RFID tags 24 having the same tag attribute are attached.

A tag position estimation model Mb includes time-series change patterns of the RSSI and phase values obtained by placing RFID tags 24 having a tag attribute different from the tag attribute of the RFID tags 24 used for the tag position estimation model Ma in multiple different positions. Also, the tag position estimation model Mb includes time-series change patterns of the RSSI and phase values obtained by placing, in multiple different positions, items 22 that have an item attribute different from the item attribute of the items 22 used for the tag position estimation model Ma and to which the RFID tags 24 having the same tag attribute are attached.

Thus, the generated tag position estimation models Mi (i=a, b, c, . . . ) are associated with different tag attributes and/or different item attributes. The association between each tag position estimation model Mi (i=a, b, c, . . . ) and a tag attribute and/or an item attribute is stored, for example, as header information of the tag position estimation model Mi.

For example, the tag position estimation model Ma may be generated by using RFID tags 24 having a particular inlay type. The tag position estimation model Mb may be generated by using multiple units of the same RFID tag 24 attached to multiple units of the same item 22 containing a metal. The tag position estimation model Mc may be generated by using multiple units of the same RFID tag 24 attached to multiple units of the same item 22 that contains a metal and particularly influences the reading performance. A tag position estimation model Md may be generated by using multiple units of the same RFID tag 24 attached to multiple units of the same item 22 having a high dielectric constant. A tag position estimation model Me may be generated by using multiple units of the same RFID tag 24 attached to multiple units of the same item 22 that includes neither a metal nor a dielectric.

Also, each tag position estimation model Mi (i=a, b, c, . . . ) is trained to compare time-series change patterns of the RSSI and phase values input from the outside with multiple sets of the time-series change patterns of the RSSI and phase values included in the tag position estimation model Mi and thereby estimate a coordinate position (x, y) in which the item 22 with the RFID tag 24 is placed to obtain the input time-series change patterns of the RSSI and phase values. Then, the tag position estimation model Mi outputs an estimated position 60 of the RFID tag 24 and a reliability level 62 of the estimated position 60 in response to the time-series change patterns of the RSSI and phase values input from the outside. The reliability level 62 indicates the reliability of the estimated position 60 of the RFID tag 24. The reliability level 62 is represented by, for example, a numerical value between 0.0 and 1.0. A reliability level of 0.0 indicates that the estimated position 60 is least reliable, and a reliability level of 1.0 indicates that the estimated position 60 is most reliable.

(Method for Estimating Tag Position Using Tag Position Estimation Model)

A method of estimating a tag position based on information acquired by the wireless tag reading apparatus 10 will be described with reference to FIG. 8. FIG. 8 is a diagram for explaining a process of estimating a tag position based on information acquired by the wireless tag reading apparatus 10.

The wireless tag reading apparatus 10 focuses on the tag attribute information Dc and the item attribute information Dd among information acquired from the RFID tag 24. Next, the wireless tag reading apparatus 10 selects a tag position estimation model Mi (i=a, b, c, . . . ) generated for the item 22 to which the RFID tag 24 having the same attribute information as the acquired tag attribute information Dc and item attribute information Dd. Then, the wireless tag reading apparatus 10 inputs acquired time-series change patterns of the RSSI and phase values to the selected tag position estimation model Mi.

The wireless tag reading apparatus 10 compares the input time-series change patterns of the RSSI and phase values with the tag position estimation model Mi and thereby outputs the estimated position 60 of the RFID tag 24 and the reliability level 62 of the estimated position 60.

The output estimated position 60 of the RFID tag 24 indicates a position (x, y) where the RFID tag 24 is present and is estimated based on the input time-series change patterns of the RSSI and phase values.

The reliability level 62 indicates the reliability of the estimated position 60 of the RFID tag 24 estimated by the tag position estimation model Mi.

The wireless tag reading apparatus 10 determines that the RFID tag 24 is in the basket 13 when the estimated position 60 of the item 22 to which the RFID tag 24 is attached is within an area in which the basket 13 is placed and the reliability level 62 is greater than or equal to a threshold value.

On the other hand, the wireless tag reading apparatus 10 determines that the RFID tag 24 is outside of the basket 13 when the estimated position 60 of the item 22 to which the RFID tag 24 is attached is outside of the area in which the basket 13 is placed and the reliability level 62 is greater than or equal to the threshold value.

Figure 9:
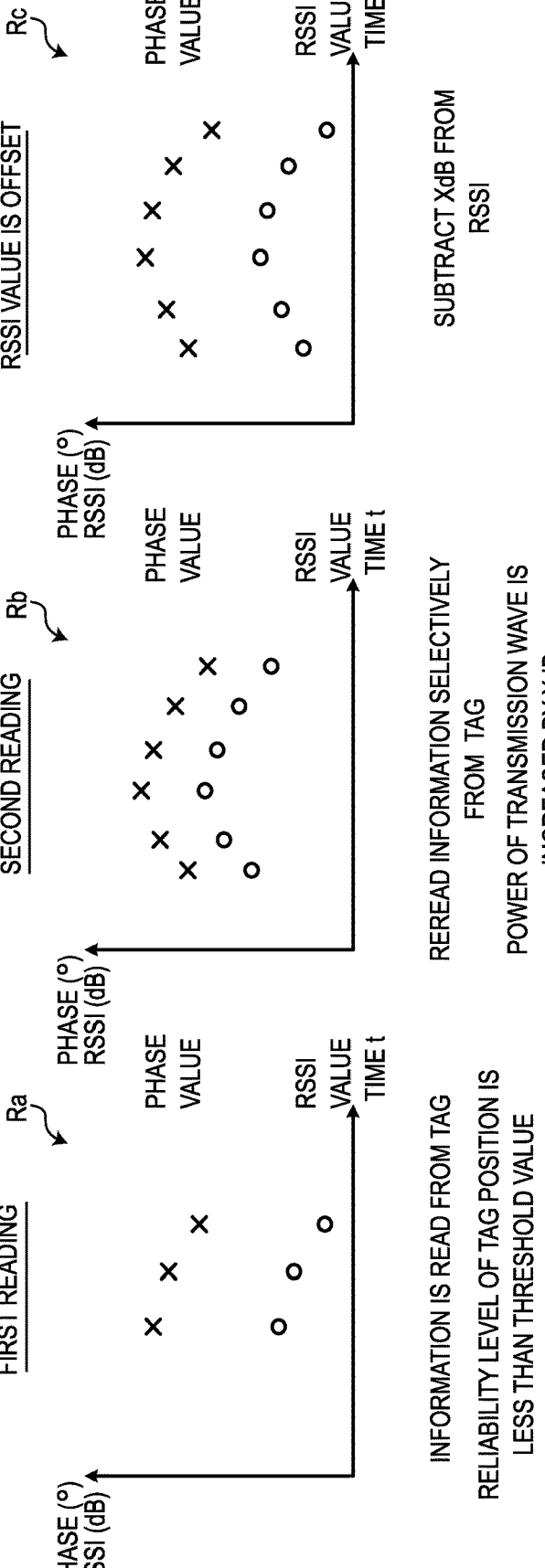
FIG. 9 is a diagram for explaining a rereading process performed by the wireless tag reading apparatus.

Further, when the reliability level 62 of the estimated position 60 is less than the threshold value, the wireless tag reading apparatus 10 rereads the tag information (see FIG. 9).

The rereading of the tag information is performed not only when the reliability level 62 of the estimated position 60 is less than the threshold value but also when the tag attribute information Dc or the item attribute information Dd read by the wireless tag reading apparatus 10 indicates a predetermined attribute. Specifically, when the tag attribute information Dc indicates a particular inlay type that possibly influences the reading performance or the item attribute information Dd indicates an item including a metal, an item having high metal influence, or an item having a high dielectric constant that possibly influences the reading performance, the wireless tag reading apparatus 10 rereads the tag information even when the reliability level 62 of the estimated position 60 is greater than or equal to the threshold value.

(Description of Rereading Process)

A rereading process of the tag information performed by the wireless tag reading apparatus 10 will be described with reference to FIG. 9. FIG. 9 is a diagram for explaining a rereading process performed by the wireless tag reading apparatus.

When the reliability level 62 of the estimated position 60 of the RFID tag 24 is low, the frequency of communication between the wireless tag reading apparatus 10 and the RFID tag 24 may decrease, and the number of samples of the RSSI and phase values may decrease as indicated by received information Ra in FIG. 9.

In such a case, the wireless tag reading apparatus 10 rereads the tag attribute information Dc and the item attribute information Dd selectively from the RFID tag 24 from which the tag attribute information Dc and the item attribute information Dd have been acquired in the first reading. In this case, the wireless tag reading apparatus 10 performs rereading with a setting "session S0". With this setting, the RFID tag 24, which has returned a response once, repeatedly returns responses when receiving transmission waves from the antennas 14 and 15. As a result, the wireless tag reading apparatus can repeatedly obtain a large number of response waves only from the selected RFID tag 24 in a short response time.

Further, in order to improve the signal-to-noise (S/N) ratio of the received information, the wireless tag reading apparatus 10 increases the power of the transmission waves when performing the rereading. For example, the wireless tag reading apparatus 10 increases the power of the transmission waves by X dB when performing the rereading. The amount of increase in the power of the transmission waves may be set at a predetermined value.

As a result, received information Rb illustrated in FIG. 9 is obtained. As the received information Rb indicates, the number of samples of the RSSI and phase values is greater than the number of samples in the received information Ra. In addition, the RSSI value becomes greater than that in the received information Ra due to the increase in the power of the transmission waves. Further, as a result of increasing the power of the transmission waves, response waves can be obtained even at antenna positions where response waves were not obtained in the first reading.

Further, when the tag attribute information Dc or the item attribute information Dd read in the first reading includes a predetermined attribute, the wireless tag reading apparatus 10 performs rereading as described above regardless of the reliability level 62 of the estimated position 60.

In this case, the power of the transmission waves is increased by an amount corresponding to the tag attribute information Dc or the item attribute information Dd. For each item for which the power of the transmission waves needs to be increased when rereading is performed, the amount of increase of the power of the transmission waves is registered in advance in the inlay type Dca, the metal-containing information Ddb, the metal influence information Ddc, and the dielectric constant information Ddd in the read data D (see FIG. 4). When the reliability level 62 of the estimated position 60 becomes less than the threshold value during the rereading for an item for which the power of the transmission waves needs to be increased, the amount of increase of the power of the transmission waves registered in the read data D is used instead of the amount of increase of the power of the transmission waves used for the rereading when the reliability level 62 becomes less than the threshold value.

By performing the rereading as described above, the received information Rb shown in FIG. 9 is acquired. Then, the wireless tag reading apparatus 10 estimates the position of the RFID tag 24 using the tag position estimation model Mi based on the acquired received information Rb.

Here, the received information Rb is data obtained by increasing the power of the transmission waves and differs from the training data used in generating the tag position estimation model Mi. Therefore, it is not possible to estimate the tag position by simply inputting the received information Rb to the tag position estimation model Mi. Therefore, the wireless tag reading apparatus 10 corrects each RSSI value De when estimating the tag position.

Specifically, the wireless tag reading apparatus 10 multiplies each RSSI value De in the received information Rb by 1/A when the power of the transmission waves is multiplied by A at the time of rereading. In other words, when the power of the transmission waves is increased by X dB at the time of rereading, X dB is subtracted from each RSSI value De in the received information Rb (i.e., the RSSI value De is offset by X dB in the negative direction).

As a result, received information Rc illustrated in FIG. 9 is obtained. Then, the wireless tag reading apparatus 10 inputs the received information Rc to the tag position estimation model Mi identified by the tag attribute information Dc and the item attribute information Dd, and estimates the tag position according to the method described with reference to FIG. 8.

(Functional Configuration of Wireless Tag Reading Apparatus)

Figure 10:
FIG. 10 is a functional block diagram of a configuration of the wireless tag reading apparatus according to an embodiment.

A functional configuration of the wireless tag reading apparatus 10 will be described with reference to FIG. 10. FIG. 10 is a block diagram illustrating an example of a functional configuration of the wireless tag reading apparatus 10 according to the embodiment.

The control unit 31 of the wireless tag reading apparatus 10 loads the control program P into the RAM 34 and executes the loaded control program P to implement a radio wave transmission/reception unit 51, an antenna movement control unit 52, a response wave acquisition unit 53, a tag position estimation unit 54, a tag information acquisition unit 55, a rereading control unit 56, and a notification unit 57 illustrated in FIG. 10 as functional units.

The radio wave transmission/reception unit 51 transmits a radio wave and receives a response wave from the RFID tag 24 attached to the item 22 in response to the radio wave.

The antenna movement control unit 52 moves the position of the radio wave transmission/reception unit 51 with time. Note that the antenna movement control unit 52 is an example of a movement control unit in the present disclosure.

The response wave acquisition unit 53 acquires identification information indicating attributes of the item 22 and attributes of the RFID tag 24 that are registered in the RFID tag 24 and time-series signals of RSSI values and phase values of response waves from the response waves received by the radio wave transmission/reception unit 51 being moved by the antenna movement control unit 52. Note that the response wave acquisition unit 53 is an example of a signal acquisition unit in the present disclosure.

The tag position estimation unit 54 calculates the estimated position 60 of the RFID tag 24 and the reliability level 62 of the estimated position 60 based on the RSSI and phase values.

Further, the tag position estimation unit 54 calculates the estimated position 60 of the RFID tag 24 and the reliability level 62 of the estimated position 60 based on the response waves reacquired by the rereading control unit 56. The tag position estimation unit 54 is an example of an estimation unit in the present disclosure.

The tag information acquisition unit 55 acquires the identification information registered in the RFID tag 24 and included in the response wave.

The rereading control unit 56 causes the antennas 14 and 15 to reacquire response waves selectively from the RFID tag 24 when the reliability level 62 calculated based on the response waves from the RFID tag 24 is less than the threshold value or when the identification information returned from the RFID tag 24 and acquired by the tag information acquisition unit 55 includes an attribute that greatly influences the reading result of the RFID tag 24. Note that the rereading control unit 56 is an example of a signal reacquisition unit in the present disclosure.

Also, when reacquiring a response wave, the rereading control unit 56 causes the radio wave transmission/reception unit 51 to increase the power of the radio wave to be transmitted by a predetermined amount.

Further, the rereading control unit 56 offsets each RSSI value De in a reacquired time-series signal in the decreasing direction by an amount corresponding to the amount of increase of the power of the transmitted radio wave.

When the reliability level 62 of the estimated position 60 of the RFID tag 24 is less than the threshold value even after the rereading performed by the rereading control unit 56, the notification unit 57 notifies that there is a possibility that the reading result is incorrect.

(Process Performed by Wireless Reading Apparatus)

Figure 11:
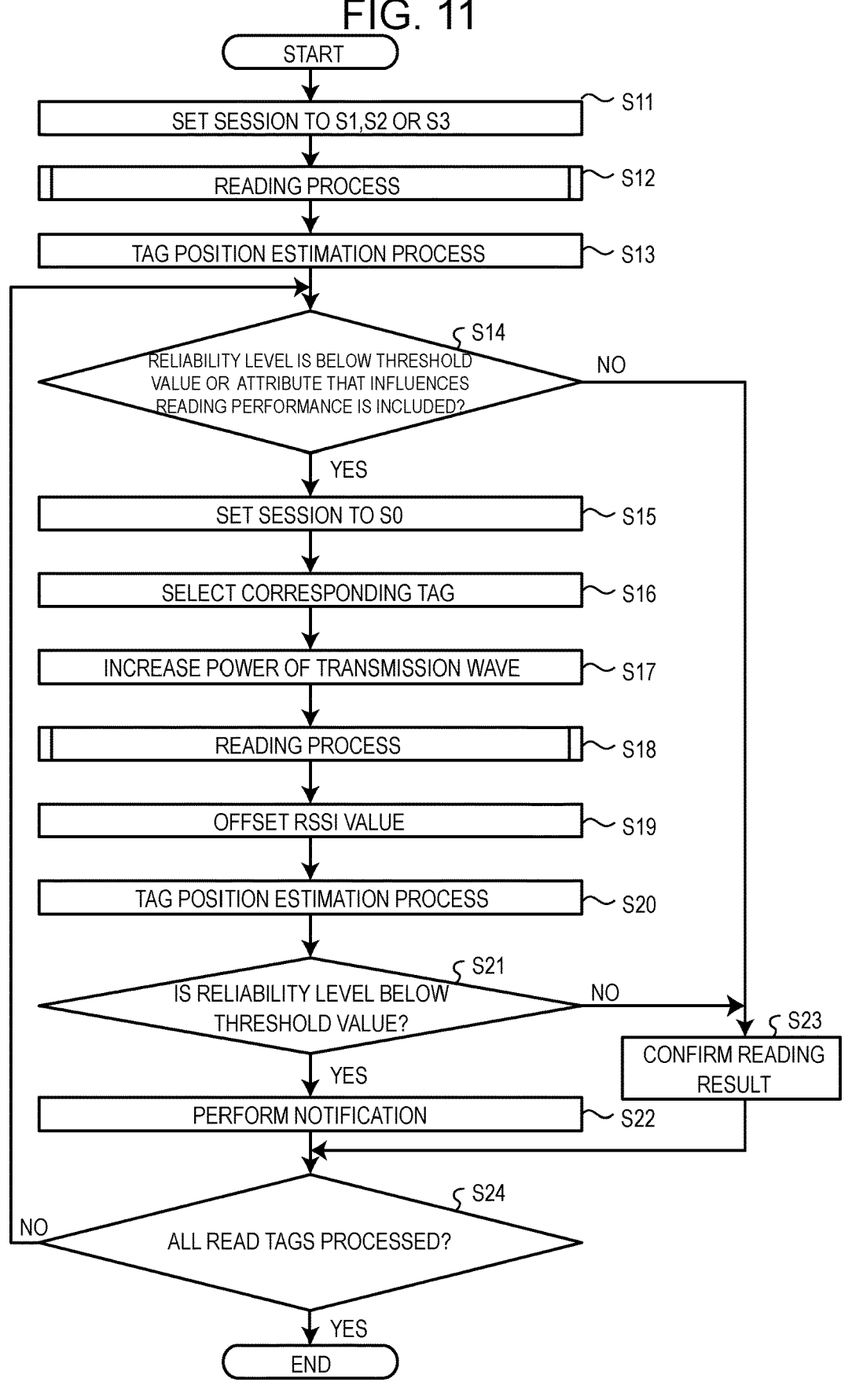
FIG. 11 is a flowchart illustrating a process performed by the wireless tag reading apparatus according to an embodiment.

A process performed by the wireless tag reading apparatus 10 will be described with reference to FIG. 11. FIG. 11 is a flowchart illustrating a process performed by the wireless tag reading apparatus 10 according to the embodiment.

The response wave acquisition unit 53 sets the session to S1, S2, or S3 (step S11).

The response wave acquisition unit 53 performs a reading process of reading the RFID tag 24 (step S12). Details of the reading process will be described later with reference to FIG. 12.

The tag position estimation unit 54 performs a tag position estimation process of calculating the estimated position 60 of the RFID tag 24 (step S13). The outline of the tag position estimation process is described above (see FIG. 8).

The rereading control unit 56 determines whether the following condition is satisfied: the reliability level 62 of the estimated position 60 of the RFID tag 24 is less than the threshold value or the read RFID tag 24 includes an attribute that influences the reading performance (step S14). When it is determined that the condition is satisfied (step S14: Yes), the process proceeds to step S15. On the other hand, when it is determined that the condition is not satisfied (step S14: No), the process proceeds to step S23.

When it is determined in step S14 that the reliability level 62 of the estimated position 60 of the RFID tag 24 is less than the threshold value or that the read RFID tag 24 includes an attribute that influences the reading performance, the rereading control unit 56 causes the response wave acquisition unit 53 to set the session to S0 (step S15).

The rereading control unit 56 selects the corresponding RFID tag 24 (step S16).

The rereading control unit 56 causes the radio wave transmission/reception unit 51 to increase the power of the radio wave to be transmitted (step S17).

The response wave acquisition unit 53 performs a reading process of reading the RFID tag 24 (step S18). Details of the reading process will be described later with reference to FIG. 12.

The rereading control unit 56 offsets the RSSI value of the response wave acquired by the response wave acquisition unit 53 (step S19).

The tag position estimation unit 54 performs a tag position estimation process of calculating the estimated position 60 of the RFID tag 24 based on the rereading result (step S20). The outline of the tag position estimation process is described above (see FIG. 8).

The rereading control unit 56 determines whether the reliability level 62 of the estimated position 60 of the RFID tag 24 is less than the threshold value (step S21). When it is determined that the reliability level 62 is less than the threshold value (step S21: Yes), the process proceeds to step S22. On the other hand, when it is determined that the reliability level 62 is not less than the threshold value (step S21: No), the process proceeds to step S23.

When it is determined in step S21 that the reliability level 62 is less than the threshold value, the notification unit 57 notifies that there is a possibility that the reading result is incorrect (step S22). For example, the notification may be made by displaying, on the display device 40, a notification screen indicating that there is a possibility that the reading of the RFID tag 24 has not been performed correctly. In this case, the reading result may also be displayed on the notification screen such that a customer can confirm the reading result by pressing an OK button when the reading result is correct. Further, when the reading result is incorrect, the customer may manually perform item registration by, for example, scanning a barcode attached to the corresponding item.

The response wave acquisition unit 53 determines whether all response waves acquired from the RFID tags 24 have been processed (step S24). When it is determined that all response waves acquired from the RFID tags 24 have been processed (step S24: Yes), the wireless tag reading apparatus 10 ends the process of FIG. 11. On the other hand, when it is determined that all response waves acquired from the RFID tags 24 have not been processed (step S24: No), the process returns to step S14, and steps S14 through S24 are repeated.

Returning to step S14, when it is determined at step S14 that the reliability level 62 of the estimated position 60 of the RFID tag 24 is not less than the threshold value and that the read RFID tag 24 does not include any attribute influencing the reading performance, the tag information acquisition unit 55 confirms the information read at step S12 (step S23). Thereafter, the wireless tag reading apparatus 10 ends the process of FIG. 11. The confirmed reading result is transmitted to a POS terminal, a higher-level server, or the like (not shown) to perform a checkout process or a payment process for the corresponding item. When it is determined at step S21 that the reliability level 62 is not less than the threshold value, step S23 is performed.

(Reading Process Performed by Wireless Tag Reading Apparatus)

Figure 12:
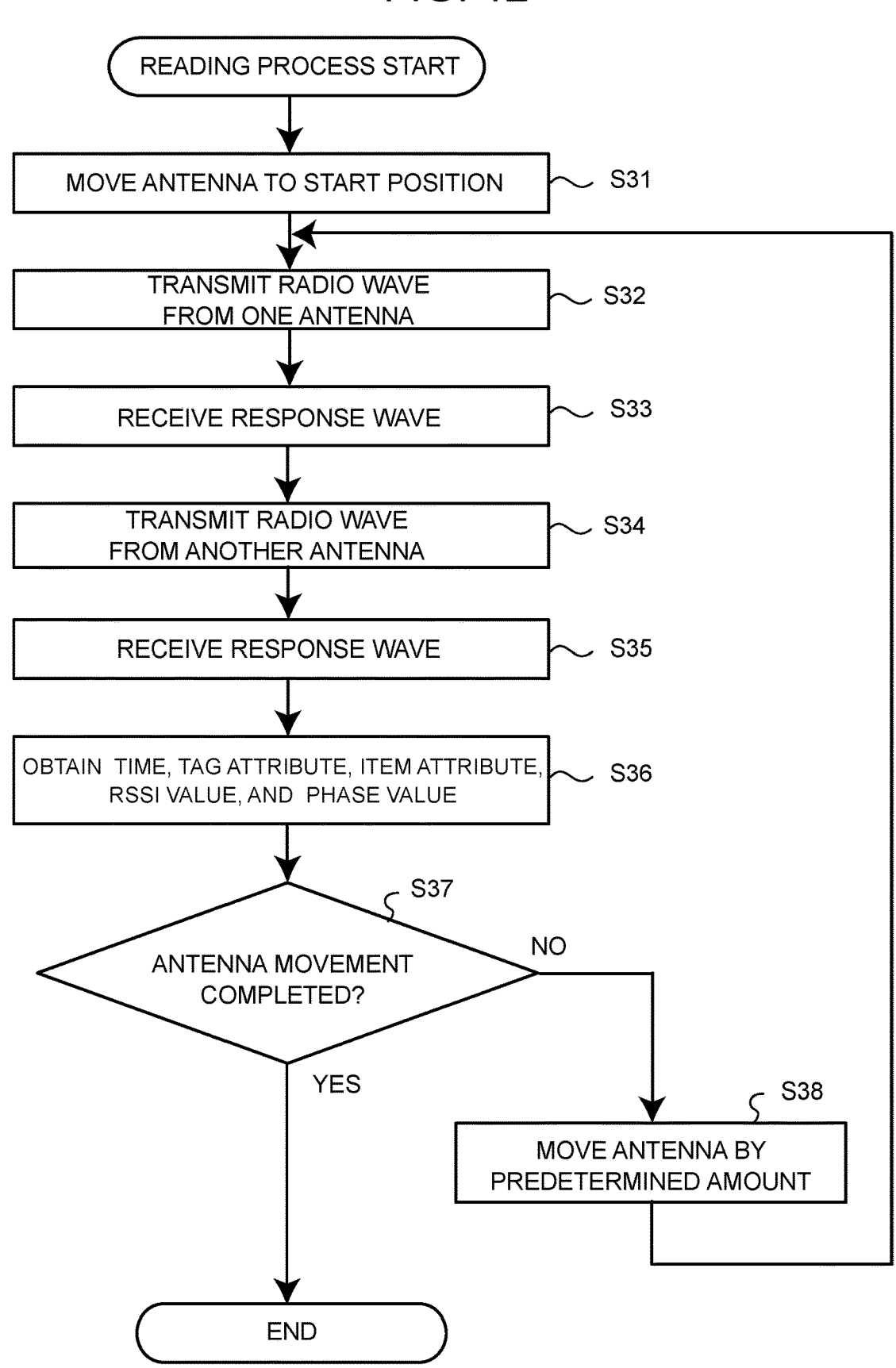
FIG. 12 is a flowchart illustrating a reading process in FIG. 11.

A reading process performed by the wireless tag reading apparatus 10 will be described with reference to FIG. 12. FIG. 12 is a flowchart illustrating an example of the reading process illustrated in FIG. 11.

The antenna movement control unit 52 moves the antennas 14 and 15 to the start position (step S31).

The radio wave transmission/reception unit 51 transmits a radio wave from one of the antennas (e.g., the antenna 14) (step S32).

The radio wave transmission/reception unit 51 receives a response wave (step S33).

The radio wave transmission/reception unit 51 transmits a radio wave from another one of the antennas (e.g., the antenna 15) (step S34).

The radio wave transmission/reception unit 51 receives a response wave (step S35).

The response wave acquisition unit 53 acquires the time at which each of the response waves is received, the tag attribute information Dc and the item attribute information Dd included in the response waves, the RSSI values De, and the phase values Df (step S36).

The antenna movement control unit 52 determines whether the movement of the antennas 14 and 15 has been completed (step S37). When it is determined that the moving of the antennas 14 and 15 has been completed (step S37: Yes), the wireless tag reading apparatus 10 ends the process of FIG. 12. On the other hand, when it is determined that the movement of the antennas 14 and 15 have not been completed (step S37: No), the process proceeds to step S38.

When it is determined at step S37 that the movement of the antennas 14 and 15 has not been completed, the antenna movement control unit 52 moves the antennas 14 and 15 by a predetermined amount (step S38). Then, the process returns to step S32, and the above-described process is repeated.

Effects of Embodiment

As described above, the wireless tag reading apparatus 10 of the present embodiment includes the radio wave transmission/reception unit 51 that transmits a radio wave and receives a response wave from the RFID tag 24 (or a wireless tag) attached to the item 22 (or an object) as a response to the radio wave, the antenna movement control unit 52 (or a movement control unit) that moves the position of the radio wave transmission/reception unit 51 with time, the response wave acquisition unit 53 (or a signal acquisition unit) that acquires, from multiple response waves received by the radio wave transmission/reception unit 51 being moved by the antenna movement control unit 52, identification information indicating an attribute of the item 22 and an attribute of the RFID tag 24 that are registered in the RFID tag 24 and time-series signals of the RSSI values De and the phase values Df of the response waves, the tag position estimation unit 54 (or an estimation unit) that calculates the estimated position 60 of the RFID tag 24 and the reliability level 62 of the estimated position 60 based on the RSSI values De and the phase values Df, and the rereading control unit 56 (or a signal reacquisition unit) that causes the antennas 14 and 15 to reacquire response waves selectively from the RFID tag 24 when the reliability level 62 calculated based on the response waves from the RFID tag 24 is less than the threshold value or when the identification information returned from the RFID tag 24 includes an attribute that greatly influences the reading result of the RFID tag 24. The tag position estimation unit 54 calculates the estimated position 60 of the RFID tag 24 and the reliability level 62 of the estimated position 60 based on the response waves reacquired by the rereading control unit 56. This configuration makes it possible to correctly read the RFID tag 24 in a predetermined area even when the item 22 to which the RFID tag 24 is attached influences the reading performance.

Further, in the wireless tag reading apparatus 10 of the present embodiment, the rereading control unit 56 (or a signal reacquisition unit) increases the power of the radio wave to be transmitted to the radio wave transmission/reception unit 51. This makes it possible to improve the S/N ratio of the response wave when performing the rereading.

Further, in the wireless tag reading apparatus 10 of the present embodiment, the rereading control unit 56 (or a signal reacquisition unit) offsets each RSSI value De in the reacquired time-series signal by an amount corresponding to the amount of increase of the power of the transmitted radio wave in the decreasing direction. This makes it possible to change the level of the RSSI value De to the level of the RSSI value used when the tag position estimation model Mi is generated and thereby makes it possible to accurately estimate the estimated position 60 of the RFID tag 24.

Further, in the wireless tag reading apparatus 10 of the present embodiment, the rereading control unit 56 (or a signal reacquisition unit) causes the antennas 14 and 15 to reacquire response waves when the identification information indicates that the item 22 (or an object) includes lame. With this configuration, it is possible to reread information selectively from the RFID tag 24 to which the item 22 is attached when there is a possibility that the item 22 influences the reading performance.

Further, in the wireless tag reading apparatus 10 of the present embodiment, the rereading control unit 56 (or a signal reacquisition unit) reacquires response waves when the identification information indicates that the RFID tag 24 includes an inlay of a predetermined type. With this configuration, it is possible to reread information selectively from the RFID tag 24 when there is a possibility that the inlay influences the reading performance.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A wireless tag reading apparatus comprising:
an antenna;
a driving mechanism configured to move the antenna between first and second positions; and
a controller configured to:
(a) cause the driving mechanism to move the antenna from the first position to the second position, and control the antenna to transmit radio waves to one or more wireless tags each attached to an object, one or more times when the antenna is between the first and second positions,
(b) acquire, from response waves received from the wireless tags:
information that is registered in each of the wireless tags and indicates an attribute of the corresponding object and an attribute of the wireless tag, and signal strength and phase values of the response waves, and
(c) calculate an estimated position of each of the wireless tags and a reliability level of the estimated position based on the signal strength and phase values,
wherein when the reliability level of the estimated position of one of the wireless tags is less than a threshold value or when the information registered in one of the wireless tags indicates an attribute that can affect radio communications, the controller performs step (a) again, acquires signal strength and phase values of response waves received from said one of the wireless tags, and calculates an estimated position of said one of the wireless tags and a reliability level thereof based on the acquired signal strength and phase values again, and
the controller is further configured to:
increase power of the radio waves transmitted from the antenna by a first amount when performing step (a) again, and
decrease the signal strength values of the response waves received from said one of the wireless tags based on the first amount before calculating again the estimated position of said one of the wireless tags and the reliability level thereof.

2. The wireless tag reading apparatus according to claim 1, wherein the controller performs step (a) again when the attribute indicates that the object contains a metal.

3. The wireless tag reading apparatus according to claim 1, wherein the controller performs step (a) again when the attribute indicates that the wireless tag includes an inlay of a predetermined type.

4. The wireless tag reading apparatus according to claim 1, wherein the controller is configured to input the signal strength and phase values of the response waves received from each of the wireless tags to an estimation model trained to output an estimated position of the wireless tag and a reliability level thereof in response to an input of signal strength and phase values of response waves.

5. The wireless tag reading apparatus according to claim 1, wherein when the reliability level of the estimated position of said one of the wireless tags is less than the threshold value, the controller issues a notification.

6. The wireless tag reading apparatus according to claim 5, wherein when the reliability level of the estimated position of said one of the wireless tags is not less than the threshold value, the controller determines that the wireless tag has been read correctly.

7. The wireless tag reading apparatus according to claim 1, wherein the controller is configured to increase power of the radio waves transmitted from the antenna by a second amount corresponding to the attribute that can affect radio communications.

8. The wireless tag reading apparatus according to claim 7, wherein the attribute that can affect radio communications includes:

an attribute of an object indicating that the object contains a metal or the object has a high dielectric constant, and an attribute of a wireless tag indicating that the wireless tag is an inlay type.

9. A non-transitory computer readable storage medium storing a program for causing a computer to execute a method comprising:

(a) causing a driving mechanism to move an antenna from a first position to a second position, and controlling the antenna to transmit radio waves to one or more wireless tags each attached to an object, one or more times when the antenna is between the first and second positions;

(b) acquiring, from response waves from the wireless tags:

information that is registered in each of the wireless tags and indicates an attribute of the corresponding object and an attribute of the wireless tag, and signal strength and phase values of the response waves; and (c) calculating an estimated position of each of the wireless tags and a reliability level of the estimated position based on the signal strength and phase values, wherein the method further comprises:

when the reliability level of the estimated position of one of the wireless tags is less than a threshold value or when the information registered in one of the wireless tags indicates an attribute that can affect radio communications, performing step (a) again, acquiring signal strength and phase values of response waves received from said one of the wireless tags, and calculating an estimated position of said one of the wireless tags and a reliability level thereof based on the signal strength and phase values acquired again;

increasing power of the radio waves transmitted from the antenna by a first amount when performing step (a) again; and decreasing the signal strength values of the response waves received from said one of the wireless tags based on the first amount before calculating again the estimated position of said one of the wireless tags and the reliability level thereof.

10. The non-transitory computer readable storage medium according to claim 9, wherein step (a) is performed again when the attribute indicates that the object contains a metal.

11. The non-transitory computer readable storage medium according to claim 9, wherein step (a) is performed again when the attribute indicates that the wireless tag includes an inlay of a predetermined type.

12. The non-transitory computer readable storage medium according to claim 9, wherein the method further comprises inputting the signal strength and phase values of the response waves received from each of the wireless tags to an estimation model trained to output an estimated position of a wireless tag and a reliability level thereof in response to an input of signal strength and phase values of response waves.

13. The non-transitory computer readable storage medium according to claim 9, wherein the method further comprises, when the reliability level of the estimated position of said one of the wireless tags is less than the threshold value, issuing a notification.

14. The non-transitory computer readable storage medium according to claim 13, wherein the method further comprises, when the reliability level of the estimated position of said one of the wireless tags is not less than the threshold value, determining that the wireless tag has been read correctly.

15. The non-transitory computer readable storage medium according to claim 9, wherein the method further comprises increasing power of the radio waves transmitted from the antenna by a second amount corresponding to the attribute that can affect radio communications.

16. A method performed by a wireless tag reading apparatus that includes an antenna and a driving mechanism configured to move the antenna between first and second positions, the method comprising:

(a) causing the driving mechanism to move the antenna from the first position to the second position, and controlling the antenna to transmit radio waves to one or more wireless tags each attached to an object, one or more times when the antenna is between the first and second positions;

(b) acquiring, from response waves from the wireless tags:

information that is registered in each of the wireless tags and indicates an attribute of the corresponding object and an attribute of the wireless tag, and signal strength and phase values of the response waves; and (c) calculating an estimated position of each of the wireless tags and a reliability level of the estimated position based on the signal strength and phase values, wherein the method further comprises:

when the reliability level of the estimated position of one of the wireless tags is less than a threshold value or when the information registered in one of the wireless tags indicates an attribute that can affect radio communications, performing step (a) again, acquiring signal strength and phase values of response waves received from said one of the wireless tags, and calculating an estimated position of said one of the wireless tags and a reliability level thereof based on the signal strength and phase values acquired again;

increasing power of the radio waves transmitted from the antenna by a first amount when performing step (a) again; and decreasing the signal strength values of the response waves received from said one of the wireless tags based on the first amount before calculating again the estimated position of said one of the wireless tags and the reliability level thereof.

* * * * *